(12) United States Patent
Rajaram et al.

(10) Patent No.: US 9,480,974 B2
(45) Date of Patent: Nov. 1, 2016

(54) NANO NI—CEO2 CATALYST FOR SYNGAS PRODUCTION AND ITS PREPARATION THEREOF

(71) Applicant: COUNCIL OF SCIENTIFIC AND INDUSTRIAL RESEARCH, New Delhi (IN)

(72) Inventors: Bal Rajaram, Uttrakhand (IN); Singha Rajib Kumar, Uttrakhand (IN); Pendem Chandrashekar, Uttrakhand (IN); Konathala Laxmi Narayan Sivakumar, Uttrakhand (IN); Bordoloi Ankur, Uttrakhand (IN)

(73) Assignee: COUNCIL OF SCIENTIFIC & INDUSTRIAL RESEARCH, New Delhi (IN)

( * ) Notice: Subject to any disclaimer, the term of this patent is extended or adjusted under 35 U.S.C. 154(b) by 0 days.

(21) Appl. No.: 14/819,708

(22) Filed: Aug. 6, 2015

(65) Prior Publication Data

US 2016/0082421 A1    Mar. 24, 2016

(51) Int. Cl.
| | |
|---|---|
| *C01B 3/40* | (2006.01) |
| *B01J 37/03* | (2006.01) |
| *B01J 35/00* | (2006.01) |
| *B01J 37/08* | (2006.01) |
| *B01J 37/04* | (2006.01) |
| *B01J 23/83* | (2006.01) |

(52) U.S. Cl.
CPC ............. *B01J 23/83* (2013.01); *B01J 35/0013* (2013.01); *B01J 37/031* (2013.01); *B01J 37/04* (2013.01); *B01J 37/08* (2013.01); *C01B 3/40* (2013.01); *C01B 2203/0261* (2013.01); *C01B 2203/1058* (2013.01); *C01B 2203/1082* (2013.01); *C01B 2203/1241* (2013.01)

(58) Field of Classification Search
CPC ...... B01J 37/04; B01J 37/08; B01J 35/0013; B01J 37/031; B01J 23/83; C01B 2203/1058; C01B 3/40; C01B 2203/1241; C01B 2203/1082; C01B 2203/0261
See application file for complete search history.

(56) References Cited

PUBLICATIONS

Odedairo et al. "Metal-support interface of a novel Ni—CeO2 catalyst for dry reforming of methane", Catalysis Communications 31 (2013) 25-31.*

* cited by examiner

*Primary Examiner* — Stanley Silverman
*Assistant Examiner* — Syed Iqbal
(74) *Attorney, Agent, or Firm* — Sughrue Mion, PLLC

(57) ABSTRACT

The present invention relates to Nano Ni—CeO$_2$ catalyst and its preparation thereof useful for syngas production. Particularly, the present invention relates to a process for the activation of methane at low temperature for the production of synthesis gas (mixture of CO and H$_2$) using nanosize Ni—Ce oxide catalyst. More particularly, the present invention relates to a process for the partial oxidation of methane to synthesis gas between temperature range of 450° C. to 800° C. at atmospheric pressure over Ni—CeO$_2$ solid catalyst. The process provides a methane conversion of 20-98% with H$_2$ to CO molar ratio of 1.6 to 2 without deactivation till 100 h.

7 Claims, 12 Drawing Sheets

NANO NI—CEO2 CATALYST FOR SYNGAS PRODUCTION AND ITS PREPARATION THEREOF

FIELD OF INVENTION

The present invention relates to nano Ni—CeO2 catalyst for syngas production and its preparation thereof. Particularly, the present invention relates to a process for the activation of methane at low temperature for the production of synthesis gas (mixture of CO and $H_2$) using nanosize Ni—Ce oxide catalyst. More particularly, the present invention relates to a process for the partial oxidation of methane to synthesis gas between temperature range of 450° C. to 800° C. at atmospheric pressure over Ni—$CeO_2$ solid catalyst. The process provides a methane conversion of 20-97% with $H_2$ to CO molar ratio of 1.6 to 2 without deactivation till 100 h.

BACKGROUND OF THE INVENTION

Natural gas is considered to be one of the most clean and ecological energy for the future and it is considered to be an area of competitiveness between various oil companies. Global demand for clean energy is increasing and especially the clean hydrogen is necessary for the use in the proton exchange membrane fuel cell. Methane is the least reactive and most abandoned natural gas on the earth. So, selective oxidative functionalization of methane is of great importance due to the growing energy demand and the depletion of fossil fuel. Methane, the most abandoned and predominant component of the natural gas is forecasted to outlast oil within 60 years. Therefore researchers are concentrating on the utilization of methane by its activation because of its plentiful abundance in many locations around the globe. The current mean projection of remaining recoverable resources of natural gas is 16,200 Trillion cubic feet (Tcf), 150 times than the current annual global gas consumption. In recent time the use of natural gas as a feedstock to synthesize chemicals or fuels is not economical because of the costly storage process and transportation system from the remote areas of the globe where it is mostly available. Particularly in recent 20 years, methods to enhance value of the natural gas methane have been investigated either by synthesizing more valuable chemicals or more easily transportable fuels. But the yields are found to be too low and because they are more reactive than methane itself and is unable to compete with the oil. Oxidative methane coupling to ethane gives maximum achievable amount of yield around 30% because there is an inherent limit and since an important part of the reaction goes through gas phase reaction kinetics. Another process is continuous direct conversion of methane to methanol or formaldehyde and the maximum yields so far achieved is 8% and 4% respectively. A recently described batch process gives >50% of methanol but it is not an ideal process because of the use of a mercury catalyst and sulfuric acid which produces sulfur dioxide and it is need to be converted back to sulfuric acid. Industrial processes for the production of hydrogen cyanide by the reaction of methane and ammonia or ammonia, oxygen and ethane by pyrolysis are available but both the processes have their drawbacks due to the high temperature requirement (more than 1027° C.). Therefore at this time the most useful economical path to utilize methane is the production of more valuable chemicals through synthesis gas generation. Now several synthesis gas production processes are available based on the purpose of industrial applications. Synthesis gas can be produced by steam reforming of methane, $CO_2$ reforming of methane, partial oxidation of methane and decomposition of methanol (mainly used in hydrogen production in fuel cells because methanol is high in energy density and easy to transport). Industrially methanol is synthesized from syngas generated from coal or natural gas. The production of synthesis can be done through following processes, (1) steam reforming of methane, (2) $CO_2$ reforming of methane, and (3) partial oxidation of methane. Till date steam reforming is the only large scale syngas production process. Steam reforming is highly endothermic and the current industrial catalysts are used in Nickel based. However nickel promotes carbon formation which deactivates the catalyst and reactor plugging. Overcoming this problem creates a new problem, the higher $H_2$/CO ratio where low ratios are desirable for industrial downstream processes. Therefore an alternative process can be synthesis gas formation by partial oxidation of methane where the $H_2$/CO ratio is perfect for the downstream processes, particularly for methanol synthesis.

Partial oxidation of methane has thermodynamic advantages over steam reforming.

(1) Partial oxidation of methane is lightly exothermic while steam reforming is highly endothermic. So partial oxidation is more economical and it can also be combined with other endothermic processes, such as steam reforming or dry reforming of methane to make this process more energy efficient.

(2) The $H_2$/CO ratio produced in stoichiometric partial oxidation is around 2 which are perfect for the industrial downstream processes, particularly for methanol synthesis. Therefore it avoids the removal of valuable hydrogen, which is produced in steam reforming process.

(3) The synthesis gas mixtures obtained by partial oxidation of methane contain very low amount of carbon dioxide content.

(4) Partial oxidation of methane avoids the need for large amount of superheated steam which is required in steam reforming. But a costly oxygen separation plant may require where nitrogen is undesirable in high pressure downstream processes.

Because of the above depicted reasons partial oxidation of methane is likely to be more important for the synthesis gas production in the recent future. The papers detailing the catalytic partial oxidation of methane to synthesis gas shows that high yields of synthesis gas can only obtained above 850° C., below this temperature non equilibrium product distribution is obtained. Thermodynamic calculation shows that higher temperature is favorable for partial oxidation of methane to produce very high $H_2$ and CO selectivity. The conventional supported nickel catalyst used for methane reforming are very active for carbon formation leads to rapid deactivation of catalyst, while coke-resistance alternatives (Rh, Ru, Pt etc) are bounded by its availability and high cost. So economic boundary conditions dictate the use of Ni based catalysts. There are reports on partial oxidation of methane over different solid catalyst but to the best of our knowledge there is no reference for the use of Ni—$CeO_2$ catalyst for this purpose, where the catalyst is stable till 100 h without any deactivation.

Reference may be made to article in the Applied Catalysis, 2011, 401, 170-175 by Z. A. Fedorova et al. where they reports Ni catalyst support on the basis MgO catalyst for partial oxidation of methane. At optimized condition with 4.5% Ni supported on Ni—MgO shows 75% methane conversion at 800° C. with a GHSV of 127000 ml $g^{-1}$ $h^{-1}$, but after 24 h time on stream the conversion drastically goes down to 55%.

Reference may be made to article in the Fuel, 2012, 97, 630-637 by E. M. Assaf and his group reported partial oxidation of methane over NiO—MgO—ZrO$_2$ catalyst with 2:1 methane to O$_2$ at 750° C. for 6 h. 40 mol % MgO showed highest conversion of ≥90%, but the catalyst shows low carbon resistance up to 6 h of time on stream with the H$_2$/CO ration of 1.6.

Reference may be made to U.S. Pat. No. US6,254,807B1 by Schmidt et al. on "control of H$_2$ and CO production in partial oxidation process" where they use at least one transition metal (preferably Ni) monolith catalyst under partial oxidation condition. In in optimized condition with monolith catalyst of 50% porosity with GHSV between 60000 to 3000000 h$^{-1}$ to achieve a methane conversion of 70% with Ni as a catalyst where it goes to 80% with Rh catalyst. Furthermore, the catalyst shows coke resistivity up to 40 h on time on stream.

Reference may be made to U.S. Pat. No. 6,402,989 B1 by A. M. Galgney, where his invention relates to a catalyst and process using promoted (at least one from the group consisting Mn, Mo, W, Sn, Re, Bi, In, P etc.) nickel based catalyst supported on MgO. The catalyst contain 1 to 50 wt % of Ni with 0.1 to 10 w % of one promoted where with Mn promoted Ni catalyst shows 100% conversion of methane at 100000 GHSV ml h$^{-1}$ g$^{-1}$ 730° C. at a pressure about 850 to 3000 kPa. But the main drawback of the process is to achieve high conversion high pressure is also required with high temperature whereas implementing such pressure may leads to phase sintering.

Reference may be made to article in the Phys. Chem. Chem. Phys., 2002, 4, 4549-4554 in which M. L. Green and his group reported the production of syngas by partial oxidation of methane over molybdenum carbide. 96% of methane conversion was achieved at 900° C. and 8 bar pressure with CH$_4$/O$_2$=2.03 and GHSV of 2000 h$^{-1}$. But the catalyst have drawback such as high cost of catalyst, considerably low GHSV, high operational pressure etc.

Reference may also be made to article in the Energy & Fuels 2003, 17, 474-481 in which R. G. Mallinson et al. reported synthesis gas production in an AC electric gas discharge of methane and air mixtures at room temperature and ambient pressure. In this report methane with oxygen and helium; CH$_4$/O$_2$/He Molar Ratio, 3:1:3.8; Overall Flow Rate, 100 cm$^3$/min; Gap Distance, 10 mm; Residence Time, 0.23 s with applied voltage 300 Hz only 18% methane conversion was observed.

Reference may be made to article in the Nature, 1990, 344, 319-321 by P. D. F. Vernon and his group reported to carry partial oxidation of methane at a temperature of 775° C. using lanthanum ruthenium oxide catalyst. In reaction with the N$_2$, methane conversion is around 90% with the selectivity of in the range of 94-99%, were found for all the rare earth oxide support with ruthenium catalyst after an induction period lasting approximately 30 minute. But the main drawback of the catalyst is it required heavy investment as the rare earth metal and ruthenium is less abundant in earth crust.

Reference may be made to article in the Indian Journal of Chemistry, Vol. 53A, April-May 2014 pp. 467-471 by Rajaram Bal et.al. where, the authors reported Ni—CeO$_2$ catalyst for the partial oxidation of methane. At optimized condition with 5% Ni—CeO$_2$ catalyst shows 86.1% of methane conversion at 800° C. The main drawback of the catalyst is its time on stability which is 30 h. and the catalyst shows activity at minimum 500° C.

The drawback of the processes reported so far is that although they exhibit sufficiently high conversions of methane for high selectivity of syngas of H$_2$/CO ratio almost 2 but the rapid formation of coke due to the local heat generation causes deactivation of catalyst. To overcome the deactivation many researchers used novel metals such as Pt, Ru, Rh etc but the rising cost and relatively poor availability desiccates the use of those catalyst in industrial purpose. On this economic boundation, Ni based catalyst will be the holy grail for the utilization of methane to future fuel in coming future. There is, therefore, an evident necessity for further improvements in the Ni based catalyst and process for the partial oxidation of methane.

OBJECTS OF THE INVENTION

The main object of the present invention is to provide nano Ni—CeO2 catalyst for syngas production and its preparation thereof. Another objective of the present invention is to provide nano Ni—CeO$_2$ catalyst which is stable upto 100 hrs without any deactivation.

Another objective of the present invention is to provide a process for activation of methane to syngas at low temperature over Nano Ni—Ce oxide catalyst using oxygen as an oxidant.

Still another object of the present invention is to provide a process, which selectively gives syngas from methane with H$_2$/CO mole ratio within 1.6-2.

Yet another object of the present invention is to provide a process which uses most abandoned natural gas having the potential to become the main source for the future fuel alternatives to produce synthesis gas, which is the main composition for the production of hydrocarbon by means of Fischer-Tropsch process.

Yet another object of the present invention is to provide a process which works under continuous process at atmospheric pressure for the production synthesis gas from methane.

Yet another object of the present invention is to provide a catalyst with a mixture of Ni and Ce oxide which can be prepared easily and also very economical to produce syngas by partial oxidation of methane.

SUMMARY OF THE INVENTION

Accordingly, the present invention provides a Nano Ni—CeO$_2$ catalyst having formula NiO—CeO$_2$ comprises NiO in the range of 2.5-10 wt % and CeO$_2$ in the range 97.5-90 wt %, wherein 2-5 nm Ni nanoparticles are present on 30-40 nm CeO$_2$ nanoparticles.

a) precipitating Ce(NO$_3$)$_3$.6H$_2$O in ethanol wherein mole ratio of Ce-salt:ethanol is in the range of 8:130 to 9:150 with 2-5% NH3 solution where Ce(NO$_3$)$_3$.6H$_2$O was used as the precursor of Ce, b) maintaining the pH of the mixture between 7-10 and stiffing the mixture for a period of 1-2 h at room temperature ranging between 30-40° C., c) heating the resultant solution at a temperature range of 80-90° C. for a period of 3-5 hrs. to obtain a thick mixture substance, d) evaporating the thick mixture substance to dryness at a temperature range of 90-100° C. for a period of 15-20 hrs to obtain solid; e) calcining the solid obtained as obtained in step (d) at a temperature range of 450-650° C. for a time period in the range of 4-8 hours to obtain Ce oxide; f) adding dropwise Ni(NO$_3$)$_2$ dissolved in water medium wherein mole ratio of Ni(NO$_3$)$_2$ 6H$_2$O:H$_2$O is in the range of 4.5×10$^{-4}$:0.55 to 9×10$^{-4}$:0.55 to the ethanolic solution of cetyltrimethylammonium bromide in mole ratio of Ni:CTAB ranging between 1:0.75 to 1:1 and stiffing the solution for a period ranging between 15-30 mins at temperature ranging between 25-35° C. to obtain Ni salt solution, g) adding Ni salt solution as obtained in step (f) with $CeO_2$ in mole ratio of Ni:$CeO_2$ ranging between 1:40 to 1:10 as obtained in step (e) in ethanol followed by adding hydrazine in mole ratio of Ni:hydrazine ranging between 1:40 to 1:160 to adjust pH in the range of 8-9 followed by stirring the mixture for the period ranging between 2-3 hrs at temperature ranging between 25-35° C., h) drying the mixture of step g) at temperature ranging between 60-90° C. for a period ranging between 15-20 hrs followed by calcining at a temperature ranging between 450-650° C. for a time period ranging between 3-10 hrs. to obtain Nano Ni—Ce oxide catalyst.

The invention also provides a process for syngas production using Ni—$CeO_2$ catalyst, the said process comprises; passing $O_2$:$CH_4$:He mixture with a molar ratio of 1:2:2 to 1:2:7 in a reactor at atmospheric pressure in the presence of Nano Ni—Ce oxide catalyst wherein methane to catalyst ratio (v/v) is in the range of $6:1.25 \times 10^{-3}$ to 20:1.15 at a temperature ranging between 450-800° C. for a period ranging between 1-100 hrs at a gas hourly space velocity (GSHV) ranging between 5000-500000 $mlg^{-1} h^{-1}$ to obtain syngas.

In an embodiment of the present invention, the activation of methane in reactor is done at 450° C.

In another embodiment of the invention, the conversion of methane is in the range of 1-98%.

In yet another embodiment of the invention, the $H_2$/CO ratio of syngas obtained is in the range of 1.6-2.0.

In another embodiment of the invention, the catalyst is stable without any deactivation up to 100 hrs.

DETAILED DESCRIPTION OF THE INVENTION

Figure 1:
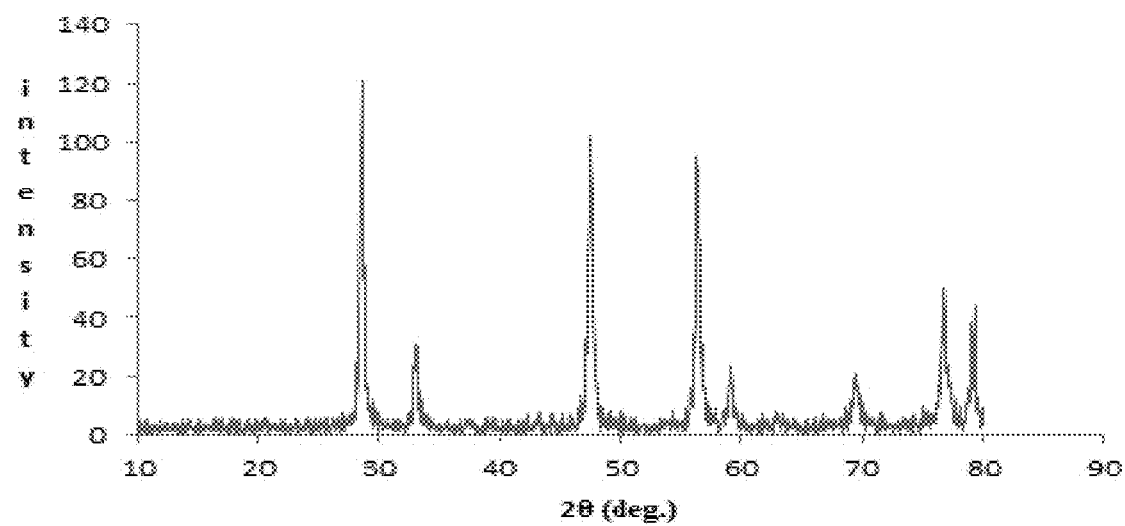
FIG. 1 X-ray Diffraction (XRD) of 2.5% Ni—$CeO_2$
FIG. 2 Scanning Electron Microscope (SEM) image of 2.5% Ni—$CeO_2$
FIG. 3 Low magnification Transmission Electron Microscope (TEM) image of 2.5% Ni—$CeO_2$
FIG. 4 High magnification TEM image of 2.5% Ni—$CeO_2$
FIG. 5 Mapping of Ce in 2.5% Ni—$CeO_2$
FIG. 6 Mapping of Ni in 2.5% Ni—$CeO_2$
FIG. 7 X-ray Diffraction (XRD) of 5% Ni—$CeO_2$
FIG. 8 SEM image of 5% Ni—$CeO_2$
FIG. 9 Low magnification TEM image 5% Ni—$CeO_2$
FIG. 10 High magnification TEM image of 5% Ni—$CeO_2$
FIG. 11 Mapping of Ce in 5% Ni—$CeO_2$
FIG. 12 Mapping of Ni in 5% Ni—$CeO_2$

The present invention provides a process for the preparation of Nano Ni—Ce oxide to produce synthesis gas by partial oxidation of methane involves the following steps.

The process for the preparation of Ni—$CeO_2$ oxide catalyst comprising the steps of:

Synthesis of $CeO_2$ oxide was carried out using precipitation of $Ce(NO_3)_3 \cdot 6H_2O$ with 2% $NH_3$ solution where $Ce(NO_3)_3 \cdot 6H_2O$ was used as the precursor of Ce.

The pH of the mixture was adjusted between 7-10.

The mixed solution was stirred for 1-2 h at room temperature.

Heating of the resultant solution was carried out in an open beaker at 80-90° C. for 3-5 hrs. to obtain a thick mixture substance.

The substance was evaporated to dryness at 90-100° C. for 15-20 hrs. The solid obtained was calcined at a range of 450-650° C. for a time period in the range of 4-8 hours to obtain Ce oxide.

Loading of Ni on $CeO_2$:

Ni was incorporated with the above prepared $CeO_2$ using the following preparation method.

$Ni(NO_3)_2$ dissolved in water-ethanol medium was added dropwise to the solution of cetyltrimethylammonium bromide dissolve in ethanol. This solution was added with the solution containing measured amount of previously prepared $CeO_2$ added with ethanol and stirred. The pH of the solution was adjusted to 7-9 by adding hydrazine solution to it.

The mixture was stirred for 1-3 h at 35° C.

The solution was dried at 60° C.-90° C. by gradual increase in temperature for 15-20 h.

The wt. % of Ni supported on nano crystalline $CeO_2$ varied in the range between 2.5 to 10.

Calcination of the materials was done in the temperature range of 450-650° C. for 3-10 h.

General Procedure for the Partial Oxidation of Methane to Synthesis Gas

The partial oxidation of methane was carried out in a fixed-bed down flow reactor at atmospheric pressure. Typically 10 to 500 mg of previously reduced (reduced at 600° C. with 20% $H_2$ balance He for 1-3 hr.) catalyst was placed in between two quartz wool plugged in the center of the 6 mm quartz reactor. The reaction was carried out with the freshly prepared catalyst at different temperatures ranging 450-800° C. The gas hourly space velocity (GHSV) was varied between 5000 to 500000 ml $g^{-1} h^{-1}$ with a molar ratio of $O_2$:$CH_4$:He of 1:2:2 to 1:2:7. The reaction products were analyzed using an online gas chromatography (Agilent 7890A) fitted with a TCD detector using two different columns Molecular sieves (for analyzing $H_2$) and Pora-Pack-Q (for analyzing $CH_4$, $CO_2$ and CO).

The following examples are given by way of illustration of working of the invention in actual practice and should not be constructed to limit the scope of the present invention in any way.

EXAMPLE-1

Preparation of $CeO_2$ 19 gm of cerium nitrate hexahydrate and 30 ml ethanol was taken in a beaker. Dissolve the salt by stirring. The pH of the solution was maintained to 8 using 2% $NH_3$. The solution was continued stirring at room temperature 30° C. for 1 hr. The temperature was raised to 80° C. and continued stirring for 3 hrs. The temperature was then raised to 100° C. and evaporated to dryness for 17 hrs. The solid substance obtained was then calcined at 550 ° C. for 6 hrs.

Preparation of 2.5% Ni—CeO2

Preparation of Ni-Salt Solution 0.15 gm CTAB (Cetyltrimethylammonium bromide) was dissolved in 10 ml ethanol and stirred for 15 minutes to get a clear solution at room temperature 30° C. Then 0.13 gm Nickel(II)nitrate hexahydrate dissolved in 10 ml water was added with the CTAB solution and stirred for 30 minutes at temperature 30° C. Then this Ni solution was added dropwise with constant stirring with the solution containing 1 gm prepared $CeO_2$ with 30 ml ethanol. The mixture was stirred for 30 minutes at 30° C. Then 1 ml hydrazine hydrate was added to maintain the pH of the solution to 8. The whole mixture was stirred for 3 hrs at room temperature 30° C. and the mixture was evaporated to dryness at 90° C. by gradual increase in temperature. Finally it was calcined at 550° C. for 6 h.

The material was characterized by XRD, SEM, elemental mapping and TEM.

Figure 2:
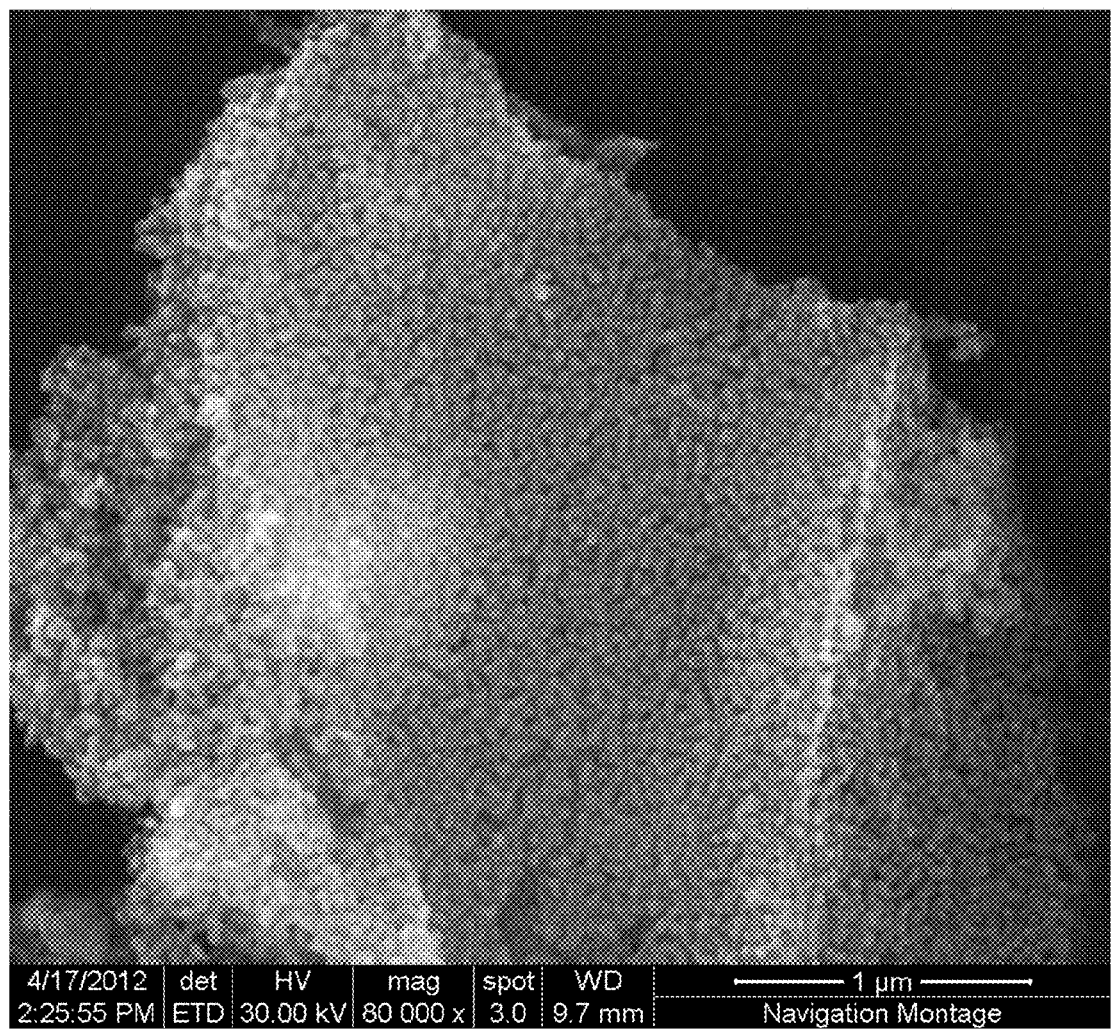
Figure 3:
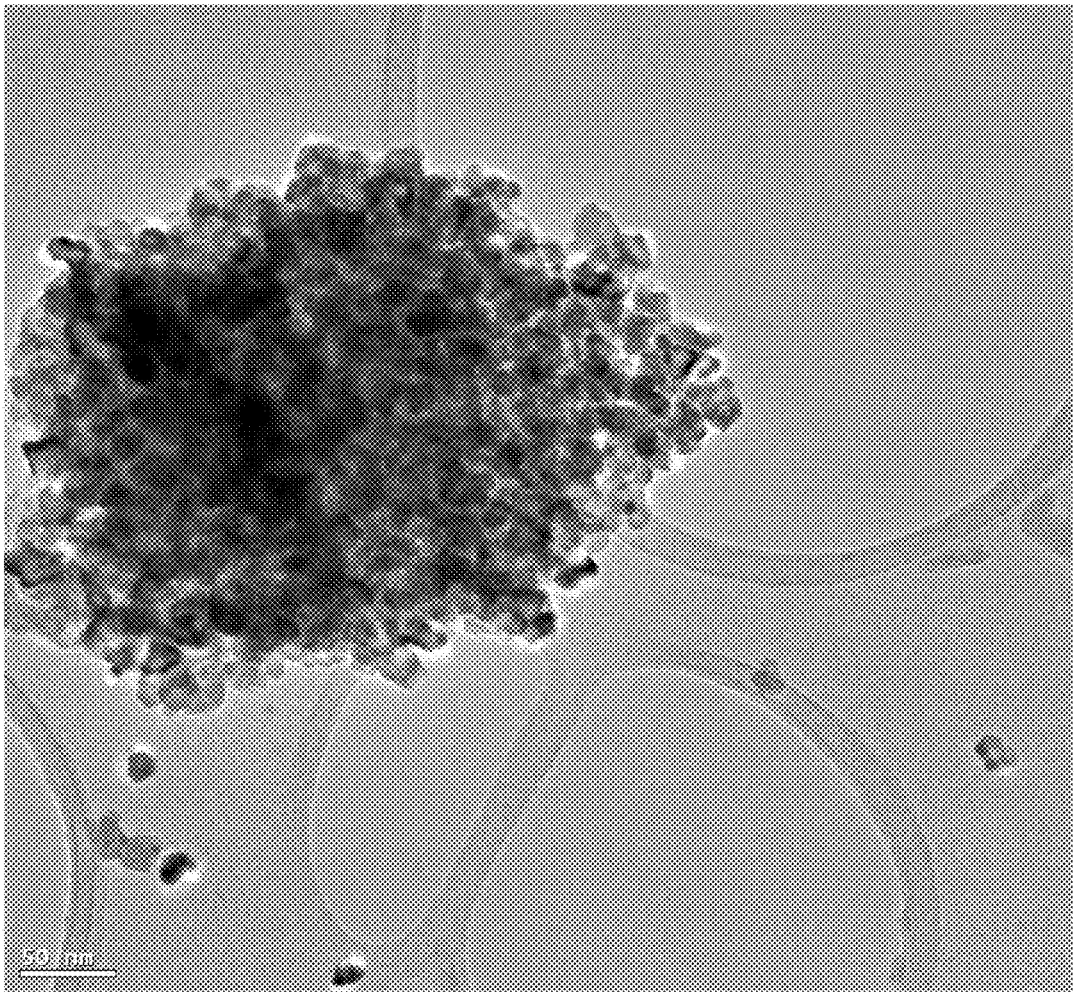
Figure 4:
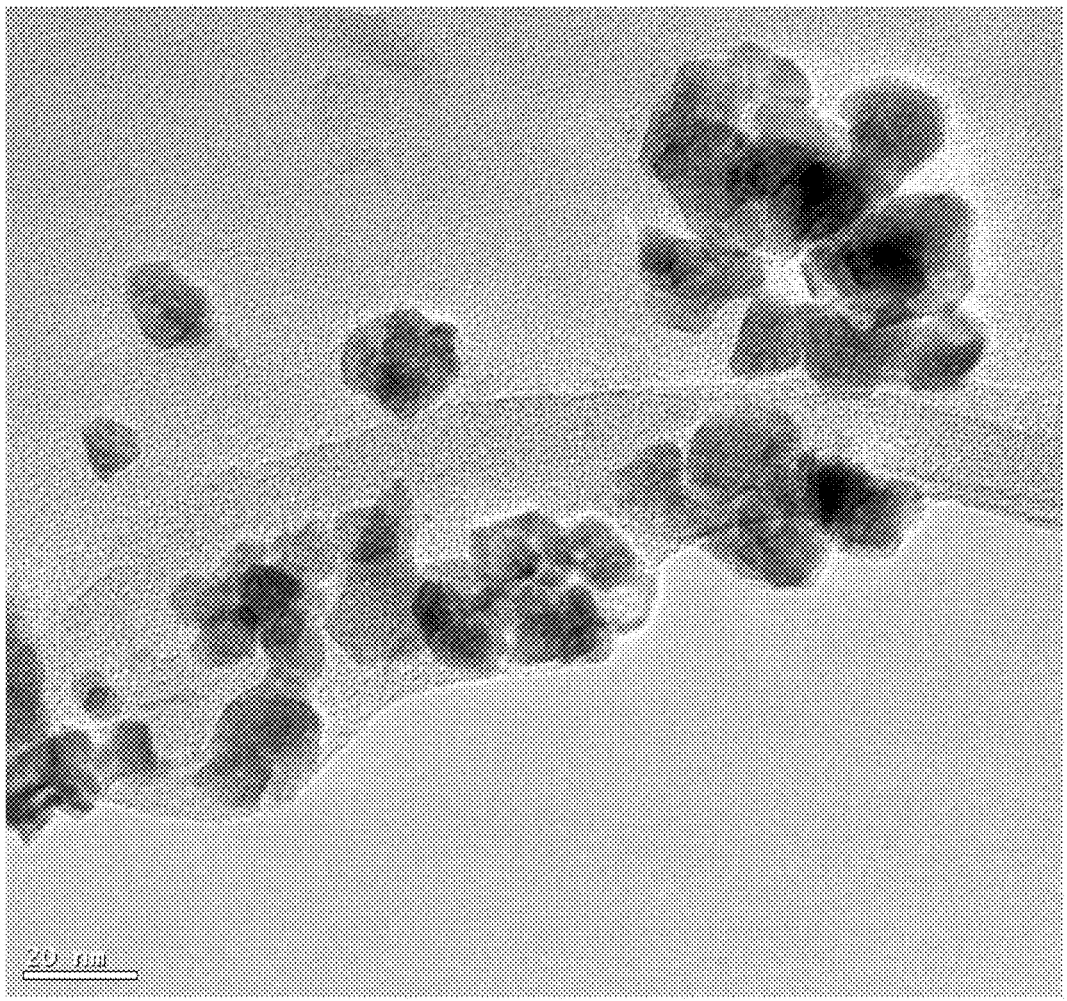
Figure 5:
Figure 6:

The XRD pattern of the 2.5% Ni—$CeO_2$ is shown in FIG. 1. XRD depicts the presence of metallic Ni, Ni-oxide and $CeO_2$ in the sample. The morphology of the material 2.5% Ni—$CeO_2$ was characterized by SEM. The typical image of the 2.5% Ni—$CeO_2$ is shown in FIG. 2. From the SEM image it is clear that the particles are almost spherical in shape. The typical TEM images of the 2.5% Ni—$CeO_2$ are shown in FIG. 3-4, which indicate that 2-5 nm Ni nanoparticles are present on 20-30 nm $CeO_2$ nanoparticles. FIG. 3 is the TEM images at low magnification and FIG. 4 is the image of the 2.5% Ni—$CeO_2$ at very high magnification. The dispersion of the Ni particles on $CeO_2$ support was analyzed by taking the elemental mapping of Ni and Ce using SEM as shown in FIG. 5 and FIG. 6. The mapping confirms that Ni is highly dispersed on $CeO_2$.

EXAMPLE 2

Preparation of $CeO_2$ 38 gm of cerium nitrate hexahydrate and 60 ml ethanol was taken in a beaker. Dissolve the salt by stirring. The pH of the solution was maintained to 10 using 2% $NH_3$. The solution was continued stirring at room temperature 30° C. for 1 hr. The temperature was raised to 80° C. and continued stiffing for 3 hrs. The temperature was then raised to 100° C. and evaporated to dryness for 16 hrs. The solid substance obtained was then calcined at 450° C. for 6 hrs.

Preparation of 5% Ni—$CeO_2$

Preparation of Ni-Salt Solution 0.30 gm CTAB (Cetyltrimethylammonium bromide) was dissolved in 10 ml ethanol and stirred for 15 minutes at room temperature (30° C.) to get a clear solution. Then 0.25 gm Nickel(II)nitrate hexahydrate dissolved in 10 ml water was added with the CTAB solution and stirred for 30 minutes at temperature 30° C. Then this Ni solution was added dropwise with constant stirring with the solution containing 1 gm prepared $CeO_2$ with 30 ml ethanol. The mixture was stirred for 30 minutes at 30° C. Then 1 ml hydrazine hydrate was added to maintain the pH of the solution to 9. The whole mixture was stirred for 3 hrs at room temperature 30° C. and the mixture was evaporated to dryness at 90° C. by gradual increase in temperature. Finally it was calcined at 550° C. for 6 h.

The material was characterized by XRD, SEM, elemental mapping and TEM.

Figure 7:
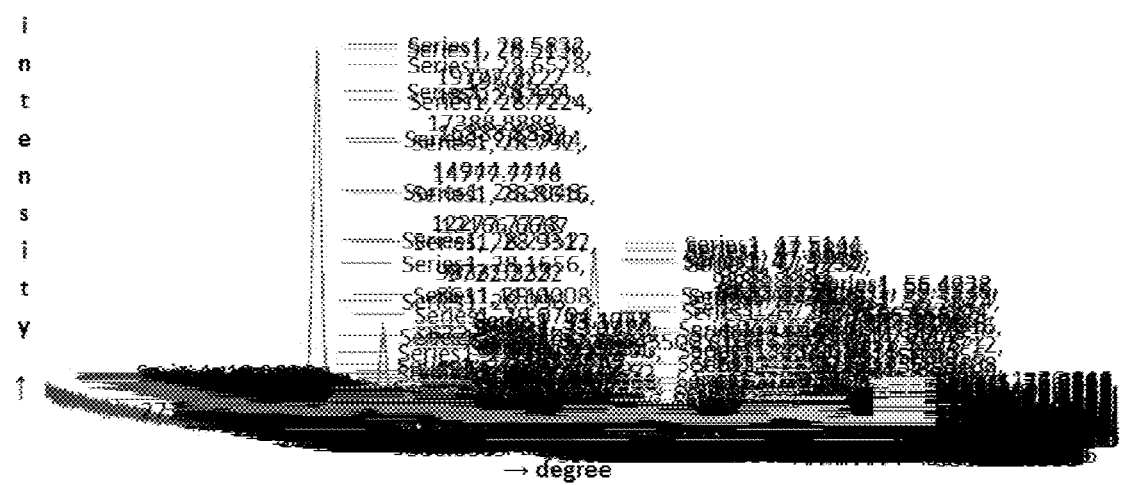
Figure 8:
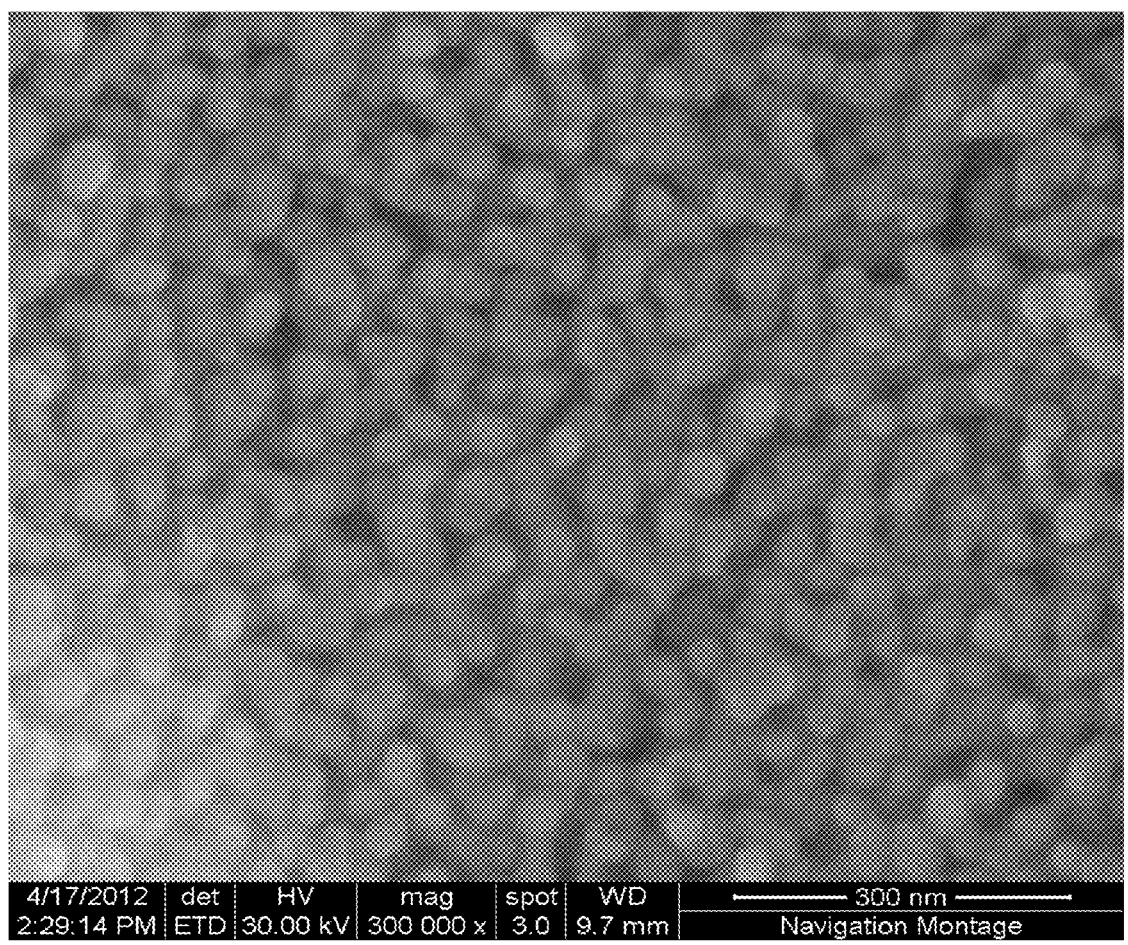
Figure 9:
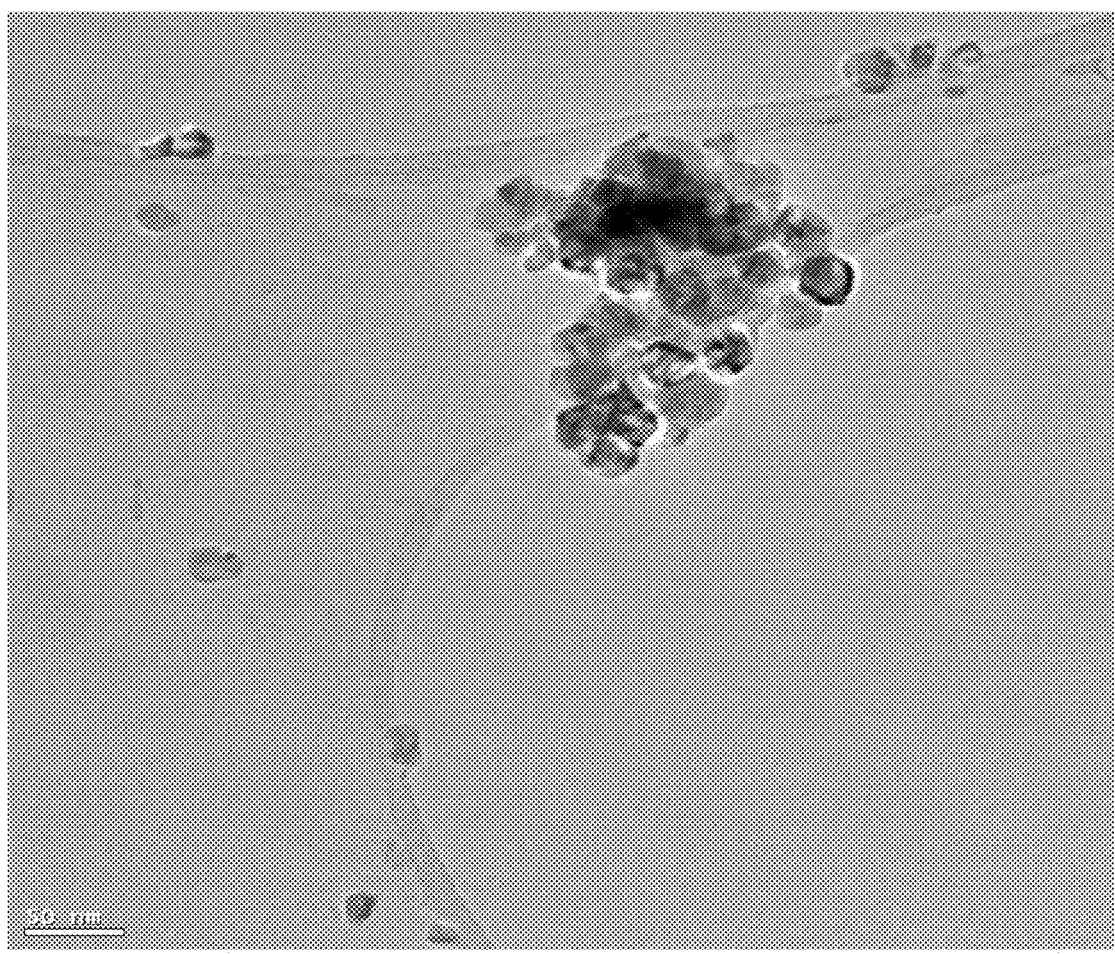
Figure 10:
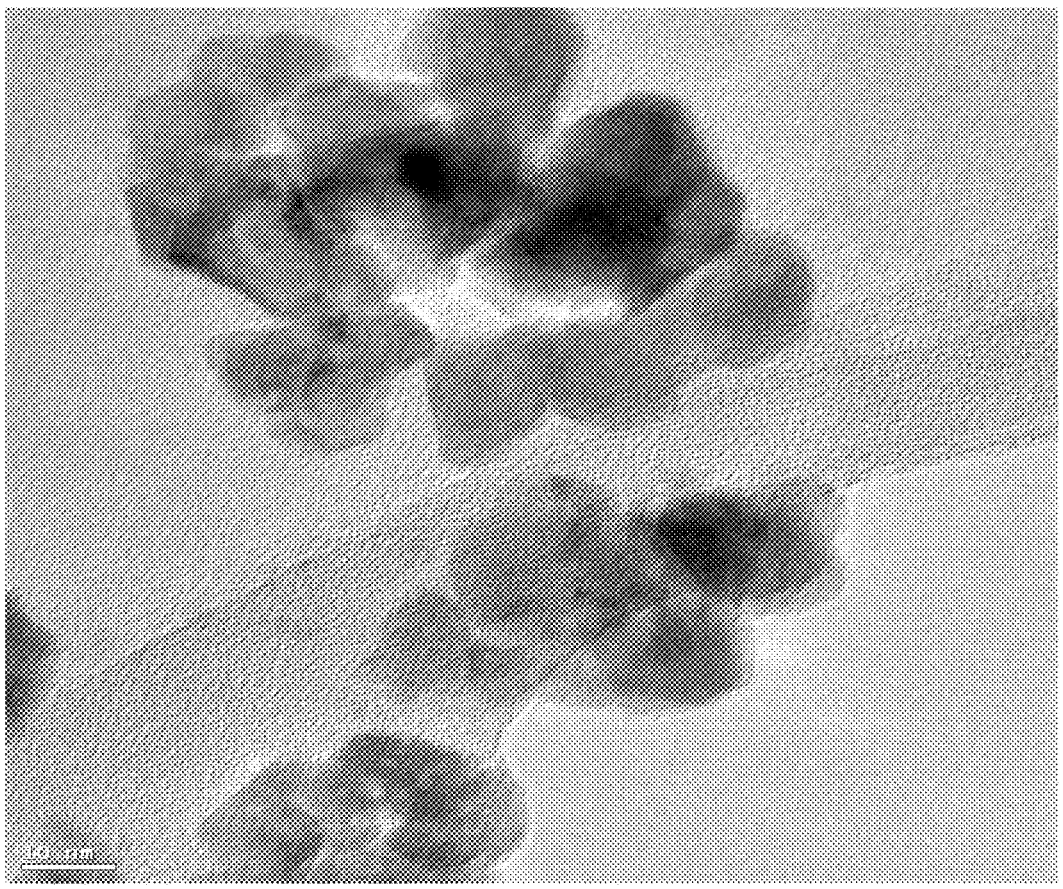
Figure 11:
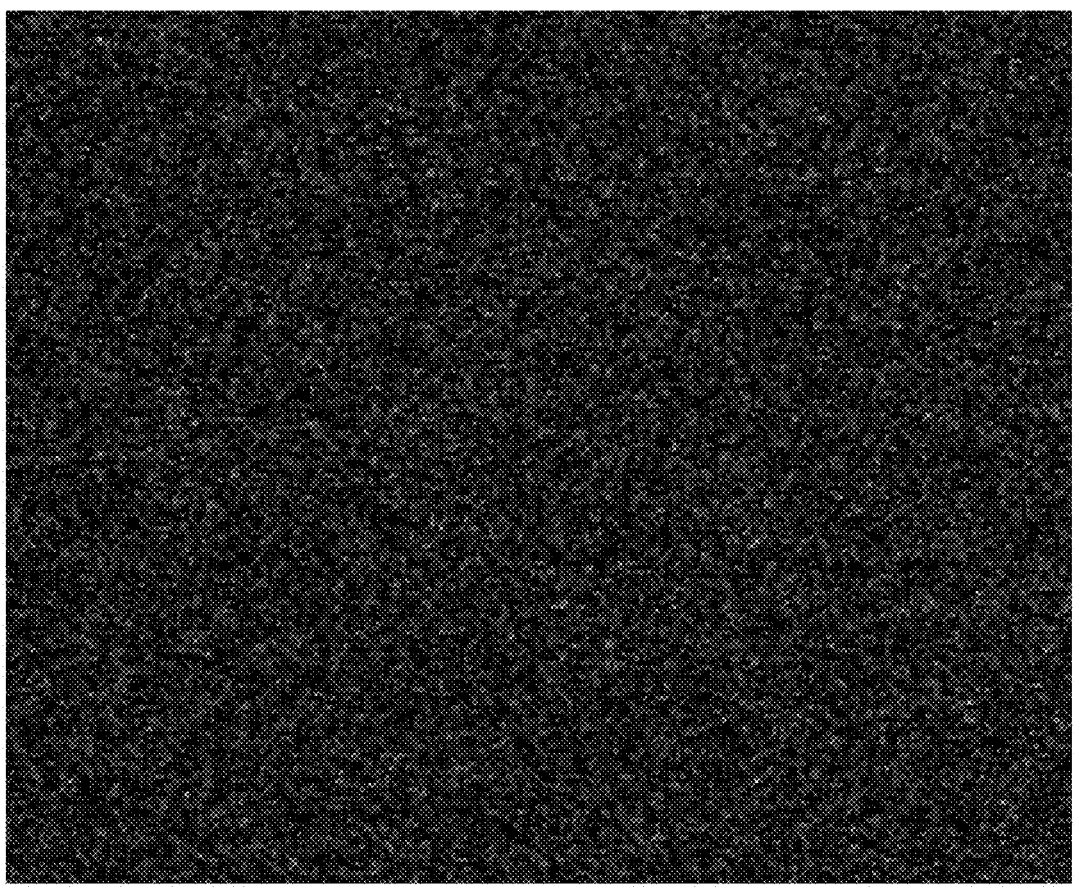
Figure 12:
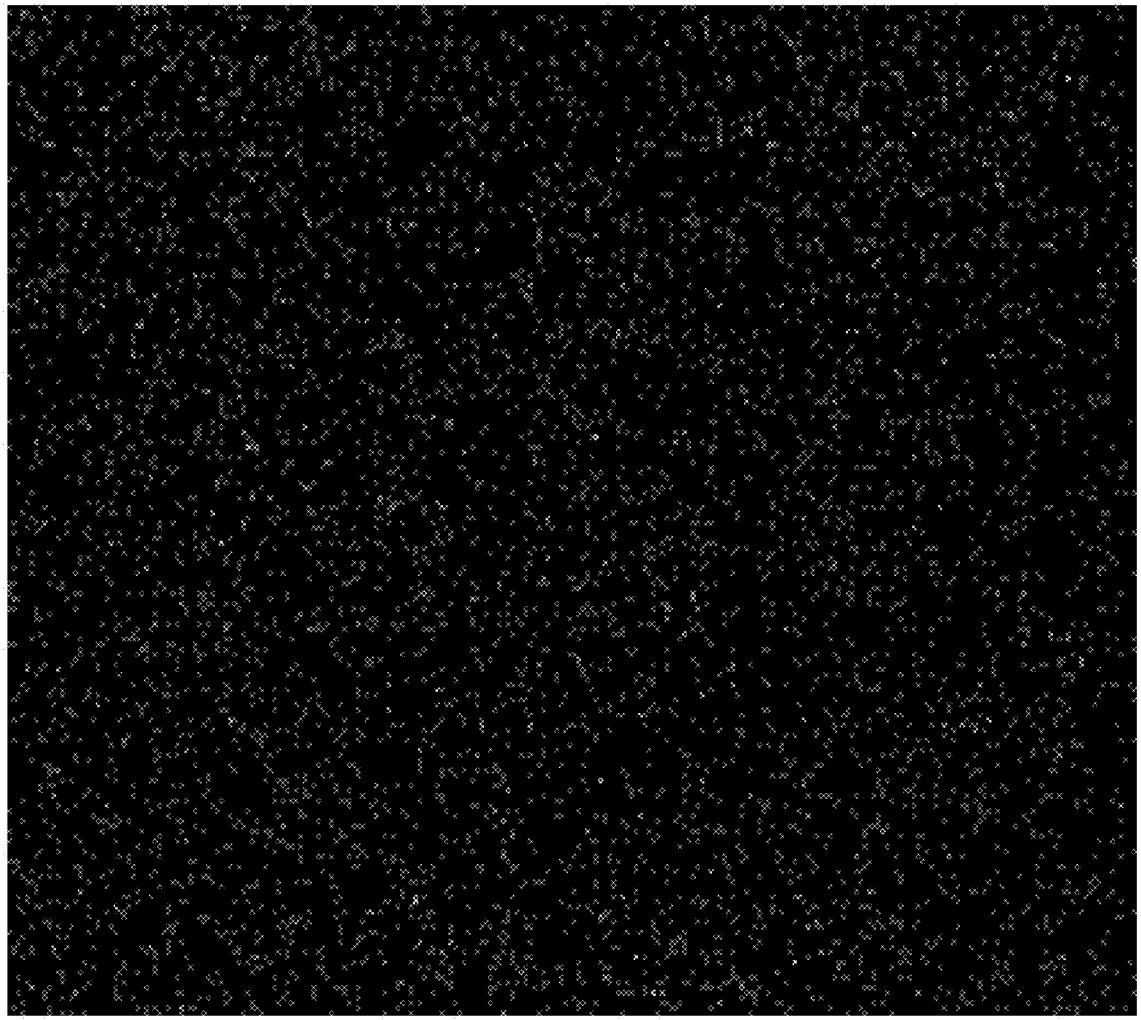

The XRD pattern of the 5% Ni—$CeO_2$ is shown in FIG. 7. XRD depicts the presence of metallic Ni, Ni-oxide and $CeO_2$ in the sample. The morphology of the material 5% Ni—$CeO_2$ was characterized by SEM. The typical image of the 5% Ni—$CeO_2$ is shown in FIG. 8. From the SEM image it is clear that the particles are almost spherical in shape. The typical TEM images of the 5% Ni—$CeO_2$ are shown in FIG. 9-10, which indicate that 2-5 nm Ni nanoparticles are present on 30-40 nm $CeO_2$ nanoparticles. FIG. 9 is the TEM images at low magnification and FIG. 10 is the image of the 5% Ni—$CeO_2$ at very high magnification. The dispersion of the Ni particles on $CeO_2$ support was analyzed by taking the elemental mapping of Ni and Ce using SEM as shown in FIG. 11 and FIG. 12. The mapping confirms that Ni is highly dispersed on $CeO_2$.

EXAMPLE-3

The example describes the effect of temperature on conversion and $H_2$/CO ratio of partial oxidation of methane. The product analysis presented in Table-1.

Process Conditions:
Catalyst: 0.30 g
Ni: $CeO_2$ weight ratio in the catalyst=5:95.
Process pressure: 1 atm.
Gas hourly space velocity (GHSV): 20000 ml $g^{-1}$ $h^{-1}$
Reaction time: 8 h
$O_2$:$CH_4$:He=1:2:7 (mol %)

TABLE 1

Effect of temperature on conversion of methane and $H_2$/CO ratio of partial oxidation of methane

| Temperature (° C.) | GHSV (ml$g^{-1}h^{-1}$) | Methane Conversion (%) | Syngas $H_2$/CO ratio |
|---|---|---|---|
| 450 | 20000 | 22.25 | 1.7 |
| 500 | 20000 | 28.79 | 1.7 |
| 550 | 20000 | 48.63 | 1.8 |
| 600 | 20000 | 60.30 | 1.8 |
| 700 | 20000 | 85.72 | 1.9 |
| 800 | 20000 | 98.33 | 1.9 |

EXAMPLE-4

The example describes the effect of gas hourly space velocity on the conversion of methane and $H_2$/CO ratio of partial oxidation of methane. The product analysis presented in Table-2.

Process Conditions:
Catalyst: 0.06 g
Ni:$CeO_2$ weight ratio in the catalyst=5:95.
Process pressure: 1 atm
Temperature: 450° C.
Reaction time: 8 h
$O_2$:$CH_4$:He=1:2:7 (mol %)

TABLE 2

Effect of gas hourly space velocity (GHSV) on the conversion of methane and $H_2$/CO ratio of partial oxidation of methane

| GHSV (ml feed/h/$g_{cat}$) | Temperature (° C.) | Methane Conversion (%) | $H_2$/CO ratio (Syngas) |
|---|---|---|---|
| 5000 | 450 | 20.01 | 1.6 |
| 10000 | 450 | 21.71 | 1.6 |
| 20000 | 450 | 22.25 | 1.6 |
| 50000 | 450 | 37.98 | 1.7 |
| 100000 | 450 | 48.78 | 1.7 |
| 200000 | 450 | 2.56 | — |
| 500000 | 450 | 3.79 | — |

EXAMPLE-5

The example describes the effect of gas hourly space velocity on the conversion of methane and $H_2$/CO ratio of partial oxidation of methane at 800° C. temperature. The product analysis presented in Table-3.

Process Conditions:
Catalyst: 0.06 g
Ni:CeO$_2$ weight ratio in the catalyst=5:95.
Process pressure: 1 atm
Temperature: 800° C.
Reaction time: 8 h
O$_2$:CH$_4$:He=1:2:7 (mol %).

TABLE 3

Effect of gas hourly space velocity (GHSV) on the conversion of methane and H$_2$/CO ratio of partial oxidation of methane

| GHSV (ml feed/h/g$_{cat}$) | Temperature (° C.) | Methane Conversion (%) | H$_2$/CO ratio (Syngas) |
|---|---|---|---|
| 5000 | 800 | 95.12 | 1.8 |
| 10000 | 800 | 97.16 | 1.8 |
| 20000 | 800 | 98.33 | 1.8 |
| 50000 | 800 | 96.54 | 1.9 |
| 100000 | 800 | 93.18 | 1.9 |
| 200000 | 800 | 89.52 | 1.9 |
| 500000 | 800 | 85.98 | 1.9 |

EXAMPLE-6

The example describes the effect of time on stream on conversion of methane and H$_2$/CO ratio of dry reforming of methane. The product analysis presented in Table 4.
Process Conditions:
Catalyst: 0.06 g
Ni:CeO$_2$ weight ratio in the catalyst=5:95.
Process pressure: 1 atm
Gas hourly space velocity (GHSV): 50000 ml g$^{-1}$ h$^{-1}$
Reaction temperature: 800° C.
Methane conversion: 92-95%
O$_2$:CH$_4$:He=1:2:7 (mole %)

TABLE 4

Effect of Time on Stream (TOS) on the conversion of methane

| GHSV (ml feed/h/g$_{cat}$) | Temperature (° C.) | Time (h) | Methane Conversion (%) |
|---|---|---|---|
| 60000 | 800° C. | 0 | 94.76 |
| | | 1 | 93.12 |
| | | 2 | 93.56 |
| | | 3 | 94.01 |
| | | 5 | 94.23 |
| | | 10 | 93.47 |
| | | 15 | 93.85 |
| | | 20 | 94.83 |
| | | 25 | 92.85 |
| | | 30 | 93.22 |
| | | 35 | 95.04 |
| | | 40 | 93.49 |
| | | 50 | 92.98 |
| | | 60 | 93.01 |
| | | 70 | 92.35 |
| | | 80 | 92.41 |
| | | 90 | 92.53 |
| | | 100 | 92.36 |

ADVANTAGES OF THE PRESENT INVENTION

The main advantages of the present invention are:
The process of the present invention is to utilize methane by converting methane to syngas through partial oxidation of methane in a single step with a single catalyst.
The process provides not only good conversion but also good H$_2$/CO ratio of syngas.

The process utilizes a major component of abandoned natural gas to produce syngas with H$_2$/CO ratio almost equal to two, which become the major advantages of this process and which can be directly use for the production of methanol and Fischer-Tropsch synthesis.

The process does not produce any major by-products which is also a major advantage of this process.

The catalyst shows no deactivation up to 100 h time on stream at 800° C.;

The catalyst is used in very low amounts.

We claim:

1. A process for the preparation of a Nano Ni—CeO$_2$ catalyst having a formula NiO—CeO$_2$ that comprises NiO in the range of 2.5-10 wt % and CeO$_2$ in the range 97.5-90 wt %, wherein 2-5 nm Ni nanoparticles are present on 30-40 nm CeO$_2$ nanoparticles, said process comprising the steps of;
    a) precipitating Ce(NO$_3$)$_3$·6H$_2$O in ethanol wherein mole ratio of Ce-salt:ethanol is in the range of 8:130 to 9:150 with 2-5% NH3 solution where Ce(NO$_3$)$_3$·6H$_2$O was used as the precursor of Ce,
    b) maintaining the pH of the mixture between 7-10 and stirring the mixture for a period of 1-2 h at room temperature ranging between 30-40° C.,
    c) heating the resultant solution at a temperature range of 80-90° C. for a period of 3-5 hrs to obtain a thick mixture substance,
    d) evaporating the thick mixture substance to dryness at a temperature range of 90-100° C. for a period of 15-20 hrs to obtain solid;
    e) calcining the solid obtained as obtained in step (d) at a temperature range of 450-650° C. for a time period in the range of 4-8 hours to obtain Ce oxide;
    f) adding dropwise Ni(NO$_3$)$_2$ dissolved in water medium wherein mole ratio of Ni(NO$_3$)$_2$ 6H$_2$O:H$_2$O is in the range of 4.5×10$^{-4}$:0.55 to 9×10$^{-4}$:0.55 to the ethanolic solution of cetyltrimethylammonium bromide in mole ratio of Ni:CTAB ranging between 1:0.75 to 1:1 and stirring the solution for a period ranging between 15-30 mins at temperature ranging between 25-35° C. to obtain Ni salt solution,
    g) adding Ni salt solution as obtained in step (f) with CeO$_2$ in mole ratio of Ni:CeO$_2$ ranging between 1:40 to 1:10 as obtained in step (e) in ethanol followed by adding hydrazine in mole ratio of Ni:hydrazine ranging between 1:40 to 1:160 to adjust pH in the range of 8-9 followed by stirring the mixture for the period ranging between 2-3 hrs at temperature ranging between 25-35° C.,
    h) drying the mixture of step g) at temperature ranging between 60-90° C. for a period ranging between15-20 hrs. followed by calcining at a temperature ranging between 450-650 ° C. for a time period ranging between 3-10 hrs. to obtain Nano Ni—Ce oxide catalyst.

2. A process for syngas production using a Ni—CeO$_2$ catalyst having a formula NiO—CeO$_2$ that comprises NiO in the range of 2.5-10 wt % and CeO$_2$ in the range 97.5-90 wt % wherein 2-5 nm Ni nanoparticles are present on 30-40 nm CeO$_2$ nanoparticles, wherein the said process comprises;
    passing O$_2$:CH$_4$:He mixture with a molar ratio of 1:2:2 to 1:2:7 in a reactor at atmospheric pressure in the presence of Nano Ni—Ce oxide catalyst wherein methane to catalyst ratio (v/v) is in the range of 6:1.25×10$^{-3}$ to 20:1.15 at a temperature ranging between 450-800° C. for a period ranging between 1-100 hrs at a gas hourly space velocity (GSHV) ranging between 5000-500000 mlg$^{-1}$ h$^{-1}$ to obtain syngas.

3. The process for syngas production as claimed in claim 2, wherein Nano Ni—Ce oxide catalyst used is in the wt ratio of Ni:CeO$_2$ from 2.5:97.5 to 10:90.

4. The process for syngas production as claimed in claim 2, wherein the activation of methane in reactor is done at 450° C.

5. The process for syngas production as claimed in claim 2, wherein the conversion of methane is in the range of 1-98%.

6. The process for syngas production as claimed in claim 2, wherein the H$_2$/CO ratio of syngas obtained is in the range of 1.6-2.0.

7. The process for syngas production as claimed in claim 2, wherein the catalyst is stable without any deactivation upto 100 hrs.

* * * * *